(12) United States Patent
Xiong et al.

(10) Patent No.: US 10,478,968 B2
(45) Date of Patent: Nov. 19, 2019

(54) DRIVING ASSEMBLY, ANKLE ASSEMBLY AND ROBOT HAVING THE SAME

(71) Applicant: UBTECH Robotics Corp, Shenzhen (CN)

(72) Inventors: Youjun Xiong, Shenzhen (CN); Meichun Liu, Shenzhen (CN); Feng Hu, Shenzhen (CN); Xinpu Chen, Shenzhen (CN); Xuchao Du, Shenzhen (CN); Wenquan Shu, Shenzhen (CN)

(73) Assignee: UBTECH ROBOTICS CORP., Shenzhen (CN)

( * ) Notice: Subject to any disclaimer, the term of this patent is extended or adjusted under 35 U.S.C. 154(b) by 219 days.

(21) Appl. No.: 15/719,532

(22) Filed: Sep. 28, 2017

(65) Prior Publication Data

US 2019/0001488 A1    Jan. 3, 2019

(30) Foreign Application Priority Data

Jul. 3, 2017  (CN) .......................... 2017 1 0531435
Jul. 3, 2017  (CN) .......................... 2017 1 0531436

(51) Int. Cl.
*B25J 9/12*  (2006.01)
*B25J 9/00*  (2006.01)
*B25J 17/00*  (2006.01)

(52) U.S. Cl.
CPC ............. *B25J 9/126* (2013.01); *B25J 9/0006* (2013.01); *B25J 17/00* (2013.01); *Y10S 901/23* (2013.01); *Y10S 901/25* (2013.01)

(58) Field of Classification Search
CPC ... B25J 9/16; B25J 9/0006; B25J 9/102; B25J 17/00; Y10S 901/23; Y10S 901/25
See application file for complete search history.

(56) References Cited

U.S. PATENT DOCUMENTS

| | | | |
|---|---|---|---|
| 9,815,192 B1 * | 11/2017 | Du | ........................... B25J 9/102 |
| 9,844,447 B2 * | 12/2017 | van der Merwe | ........ A61F 2/54 |
| 2017/0021508 A1 * | 1/2017 | Marshall | ................ A61B 34/30 |
| 2018/0186015 A1 * | 7/2018 | Xiong | ...................... B25J 17/00 |
| 2018/0194003 A1 * | 7/2018 | Jackson | .................. B25J 9/102 |
| 2018/0207796 A1 * | 7/2018 | Du | ........................... B25J 17/00 |
| 2018/0281192 A1 * | 10/2018 | Tanaka | ................ G05D 1/0094 |
| 2019/0030707 A1 * | 1/2019 | Chen | ....................... B25J 5/007 |

* cited by examiner

*Primary Examiner* — Kevin Hurley
*Assistant Examiner* — Marlon A Arce

(57) ABSTRACT

A driving assembly for a joint of a robot includes a first driving source having a first output shaft; a second driving source; and a gear set including a first gear and second gear that are engaged with each other. The first gear is arranged around the first output shaft. An ankle assembly and a robot having the driving assembly are also provided.

12 Claims, 8 Drawing Sheets

US 10,478,968 B2

DRIVING ASSEMBLY, ANKLE ASSEMBLY AND ROBOT HAVING THE SAME

CROSS REFERENCE TO RELATED APPLICATIONS

This application claims priority to Chinese Patent Application Nos. 201710531435.2 and 201710531436.7, both filed Jul. 3, 2017, which is hereby incorporated by reference herein as if set forth in its entirety.

BACKGROUND

1. Technical Field

The present disclosure generally relates to robots, and particularly to a driving assembly, an ankle assembly and a robot including the ankle assembly.

2. Description of Related Art

Humanoid robots have arms, legs, a body and a head, and can perform various tasks. In order to perform these tasks, it requires humanoid robot to have flexible joints.

The ankles of some conventional humanoid robots include one servo, and enable the feet of the robot to rotate up toward corresponding legs and downwards toward the floor (i.e., dorsiflexion and plantarflexion.) However, the feet cannot rotate inwards and outwards (i.e, inversion and eversion.) There also exist ankles of humanoid robots that include two servos. Because the output shafts of such ankles are small, the transmission force and driving force thereof are limited, which cannot provide better support.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Figure 1:
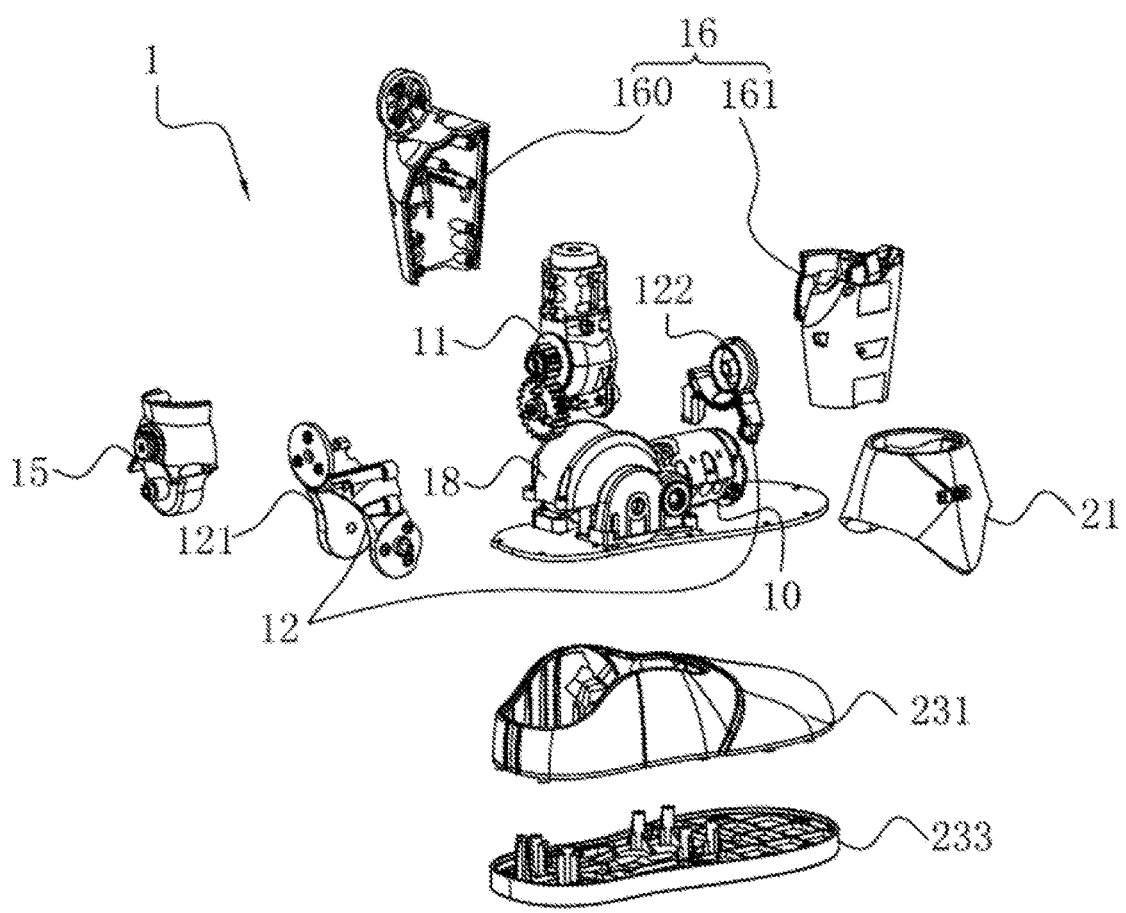
FIG. 1 is an isometric partially exploded view of an ankle assembly of a robot according to one embodiment.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

Figure 2:
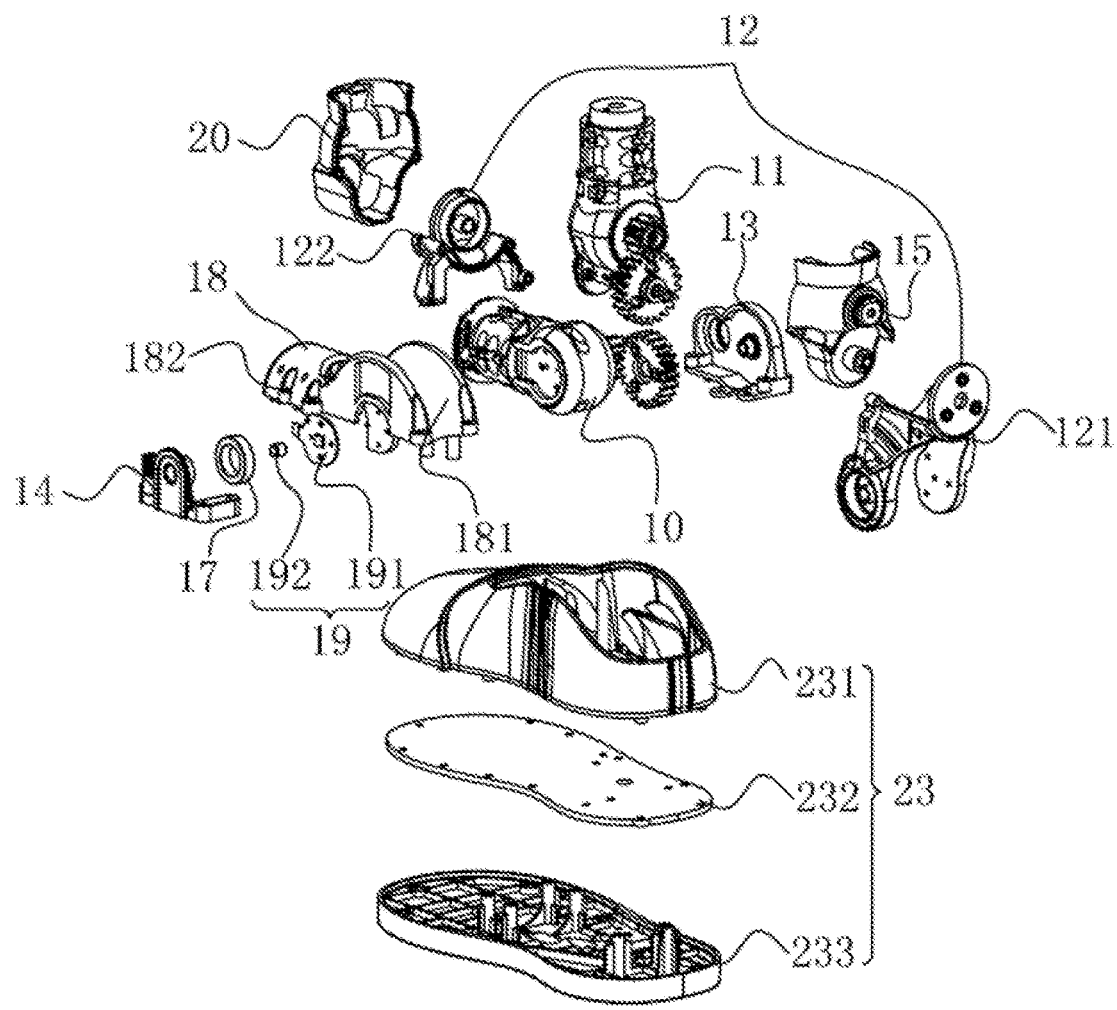
FIG. 2 is an isometric partially exploded view of the ankle assembly of FIG. 1, viewed from another view point.
Figure 3:
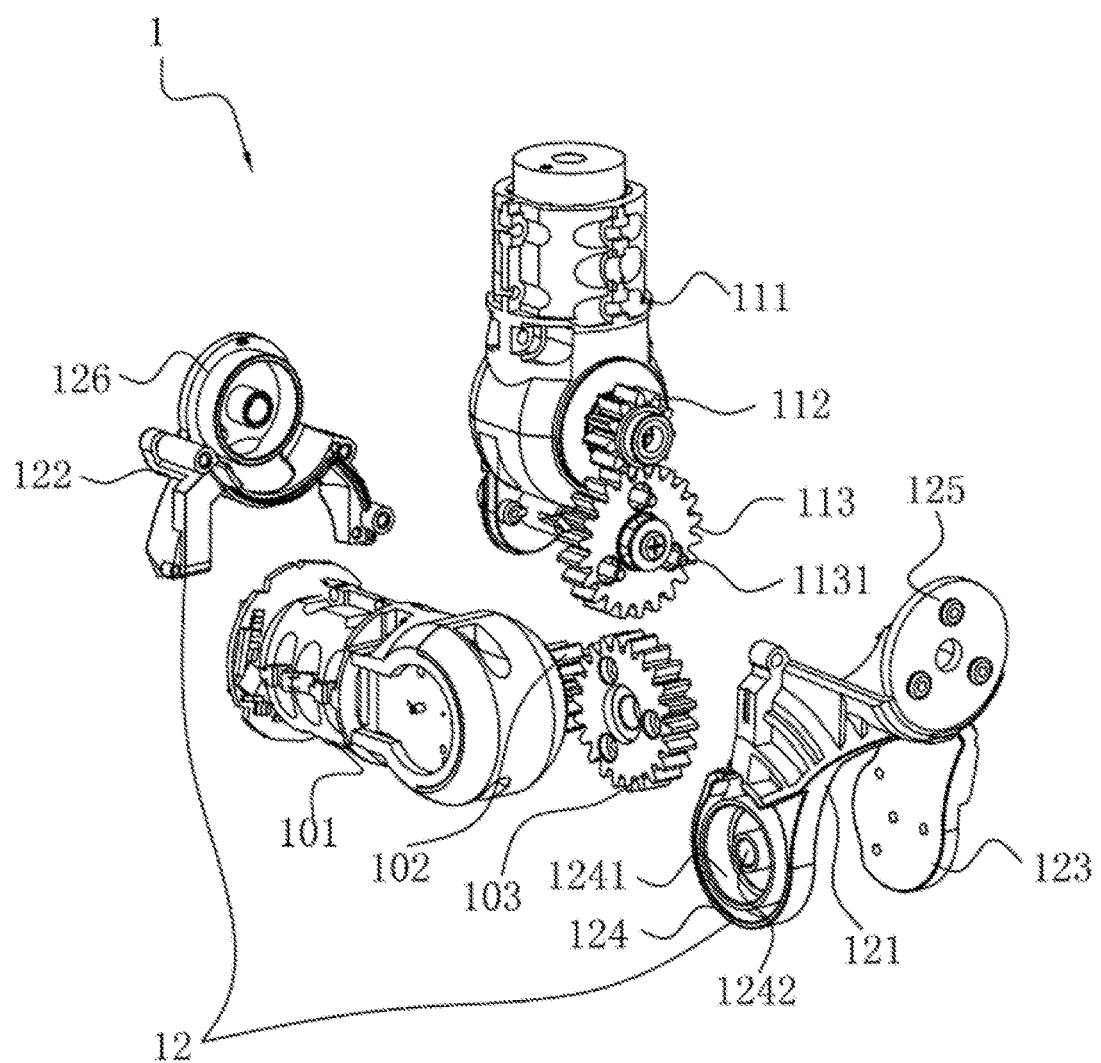
FIG. 3 is an isometric exploded view showing a first driving assembly, a second driving assembly and a connection support of the ankle assembly of FIG. 1.

Referring to FIGS. 1-3, in one embodiment, an ankle assembly 1 of a robot is arranged between a foot 23 and at least a portion of a leg 16. The ankle assembly 1 includes a first driving assembly 10, a second driving assembly 11 and a connection support 12.

The first driving assembly 10 is connected to the foot 23. The second driving assembly 11 is connected to the at least a portion of the leg 16. The connection support 12 is connected to the first driving assembly 10 and the second driving assembly 11.

The first driving assembly 10 includes a first driving source 101, a first gear 102 and a second gear 103. The first drive source 101 is connected to the foot 23. The first driving source 101 is opposite to the at least a portion of the foot 23. The first gear 102 is driven to rotate by an output shaft of the first driving source 101. The first gear 102 and the second gear 103 are engaged with each other, and the number of teeth of the first gear 102 is smaller than the number of teeth of the second gear 103. The second gear 103 is connected to the connection support 12. When the first gear 102 rotates, the second gear 103 is rotated by the first gear 102, which enables the first driving source 101 and the foot 23 rotate, as a whole, about a central axis of the second gear 103.

The second driving assembly 11 is connected to the connection support 12, and is used to drive the connection support 12 to rotate inwards and outwards with respect to the leg, enabling the ankle assembly 1 to have the ability of inversion and eversion.

In the embodiment, the ankle assembly 1 includes the first gear 102 and the second gear 103 that are engaged with each other and external of the first driving source 101. The first driving source 101 is used to drive the first gear 102 to rotate. The number of teeth of the first gear 102 is smaller than the number of teeth of the second gear 103, forming a reduction mechanism at the outside the first driving source 101, which increases the output torque of the first driving source 101 and can avoid the situation of driving power shortage. On the other hand, in the embodiment, the ankle assembly 1 is provided with the first driving assembly 10 and the second driving assembly 11, and the connection support 12 is used as a rotary joint that enables the first driving assembly 10 and the second driving assembly 11 to be rotatable with respect to the connection support 12. The axis that the first driving assembly 10 rotates about and the axis that the second driving assembly 11 rotates about are perpendicular to each other. Since the first driving assembly 10 is connected to the foot 23 and the second driving assembly 11 is connected to the at least a portion of the leg 16, multiple rotational degrees of freedom of the foot 23 are achieved while the connection support 12 is able to provide a stable support.

Figure 4:
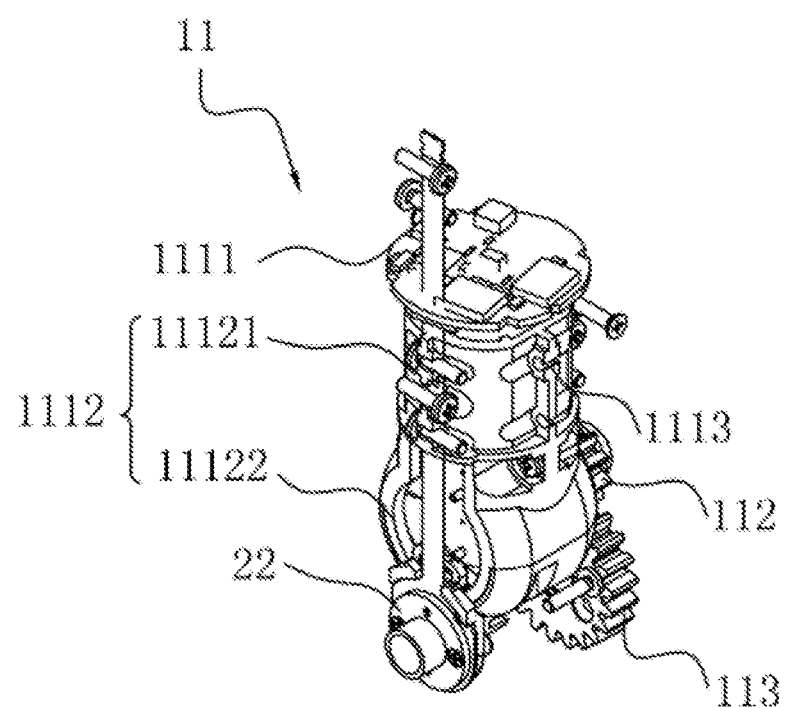
FIG. 4 is an isometric view of the second driving assembly of FIG. 3.

As shown in FIGS. 3 and 4, in one embodiment, the second driving assembly 11 includes a second driving source 111, a third gear 112 and a fourth gear 113. The second driving source 111 is fixed to the at least a portion of the leg 16. An output shaft of the second driving source 111 is used to drive the third gear 112 to rotate. The third gear 112 is engaged with the fourth gear 113. A number of teeth of the third gear 112 is smaller than a number of teeth of the fourth gear 113. The fourth gear 113 is connected to the connection support 12, which allows the connection support 12 to rotate with respect to a central axis of the fourth gear 113, thereby achieving the inversion and eversion of the ankle assembly 1.

The function of third gear 112 and the fourth gear 113 to the second driving source 111 is similar to the function of the first gear 102 and the second gear 103 to the first driving source 101. That is, the third gear 112 and the fourth gear 113 form a reduction mechanism at the outside of the second driving source 111, which increases the output torque of the second driving source 111 and can avoid the situation of driving power shortage.

It can be known from the above description that the ankle assembly has two rotation axes. A first rotation axis is the central rotation axis that the second gear 103, located at a lower portion of the connection support 12 and driving the first driving assembly 10 to rotate, rotates about. A second rotation axis is the central rotation axis that the fourth gear 113, located at the upper portion of the connection support 12 and driving the connection support 12 to rotate, rotates about.

As shown in FIGS. 3-6, in one embodiment, the connection support 12 includes a first connection plate 123, a second connection plate, 124 a third connection plate 125 and a fourth connection plate 126. The first connection plate 123 and the second connection plate 124 are coaxial with each other, and the third connection plate 125 and the fourth connection plate 126 are coaxial with each other. A central axis of the first connection plate 123 and a central axis of the third connection plate 125 are perpendicular to each other but do not intersect each other. A receiving space 127 is formed between the third connection plate 125 and the fourth connection plate 126 to partly receive the fourth gear 113 therein and prevent interference of the connection support 12 with the second driving assembly 11 during rotation of the connection support 12. The second gear 103 is fixed to and coaxial with the first connection plate 123. The fourth gear 113 is fixed to and coaxial with the third connection plate 125. It is thus apparent that the first rotation axis and the second rotation axis of the ankle assembly are perpendicular to each other but do not intersect each other.

The second gear 103 includes a number of first fixing posts (not shown) on a side facing the first connection plate 123, and a plurality of first fixing holes 1231 are defined in corresponding positions of the first connection plate 123. The first fixing posts respectively pass through corresponding first fixing holes 1231 to fix the first connection plate 123. The fourth gear 113 includes a number of second fixing posts 1131 on a side facing the third connection plate 125, and a plurality of second fixing holes 1251 are defined in corresponding positions of the third connection plate 125. The second fixing posts 1131 respectively pass through corresponding second fixing holes 1251 to fix the third connection plate 125.

In other embodiments, the second gear 103 and the fourth gear 113 each may define a number of through holes. The through holes of the second gear 103 corresponds to the first fixing holes 1231 of the first connection plate 123. Screws are then used to pass through the through holes of the second gear 103 and turned into the first fixing holes 1231, thereby fixing the second gear 103 to the first connection plate 123. The through holes of the fourth gear 113 correspond to the second fixing holes 1251 of the third connection plate 125. Screws are then used to pass through the through holes of the fourth gear 113 and turned into the first fixing holes 1251, thereby fixing the fourth gear 113 to the third connection plate 125.

The connection support 12 further includes a first support 121 and a second support 122. The first support 121 and the second support 122 may be connected to each other via screws. The first connection plate 123, the second connection plate 124 and the third connection plate 125 are connected to the first support 121. The fourth connection plate 126 is connected to the second support 122.

In one embodiment, the first driving source 101 and the second driving source 111 are servos.

Figure 5:
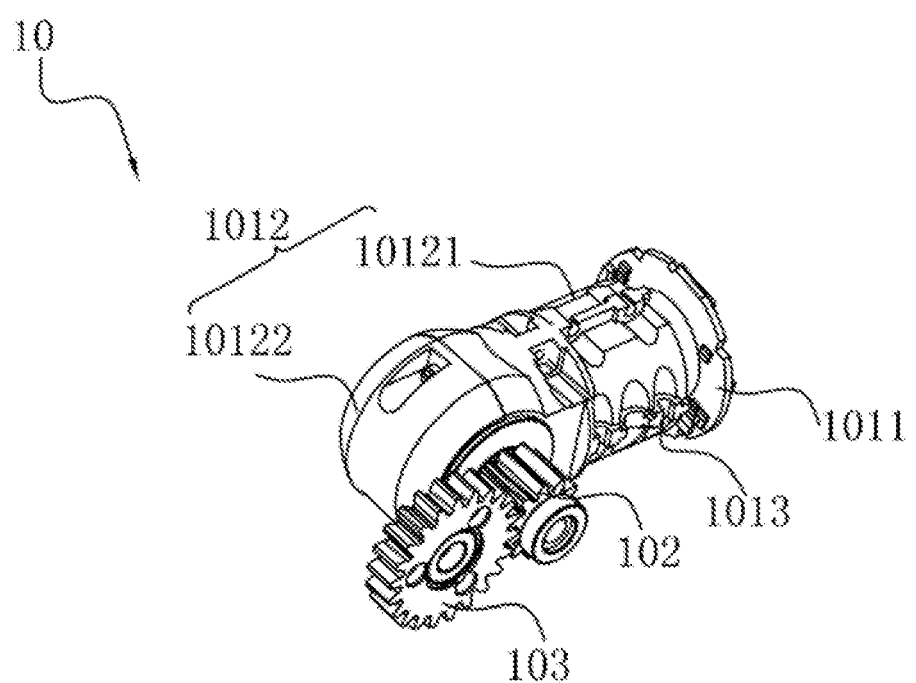
FIG. 5 is an isometric view of the first driving assembly of FIG. 3.
Figure 6:
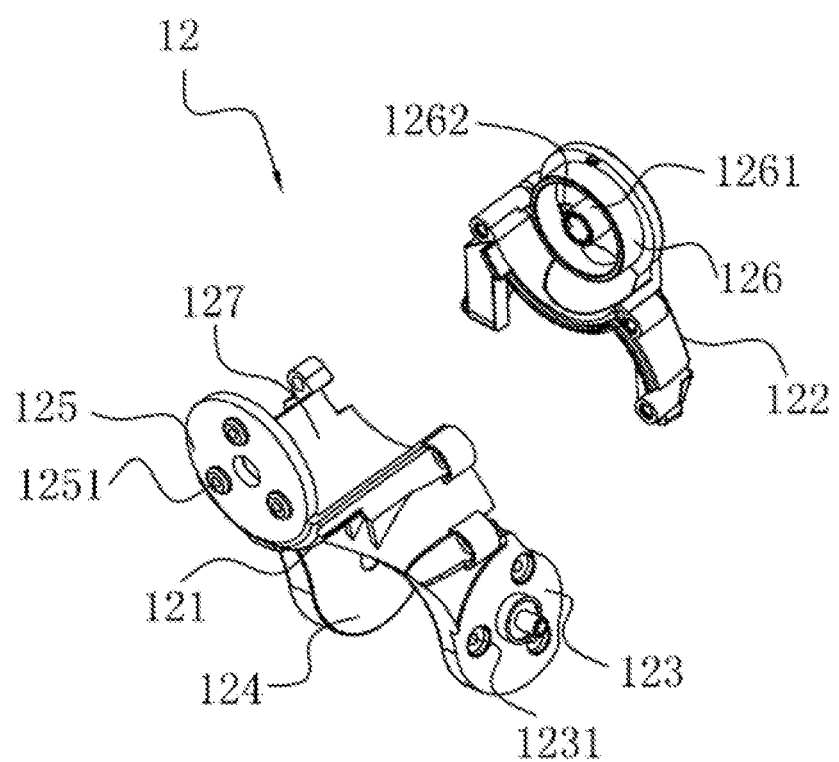
FIG. 6 is an isometric view of the connection support of FIG. 3.
Figure 7:
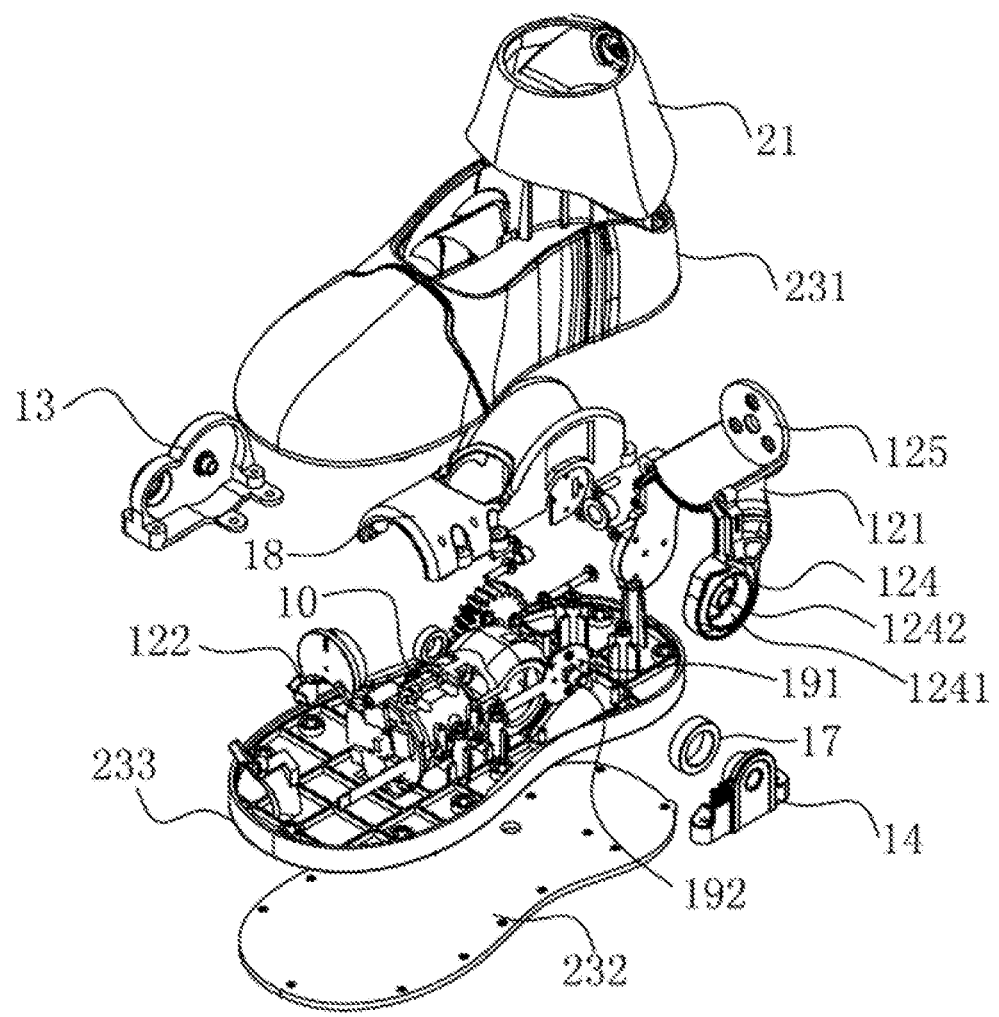
FIG. 7 is an isometric partially exploded view of the ankle assembly of FIG. 1, viewed from another view point.

Referring to FIG. 5, the first driving source 101 includes a first servo 1012 and a first driving circuit board 1011 for driving the first servo 1012. The first servo 1012 includes a first cylindrical portion 10121 and a first spherical portion 10122. The first cylindrical portion 10121 is horizontal with respect to the foot 23. The first spherical portion 10122 is connected to one end of the first cylindrical portion 10121. The output shaft of the first servo 1012 protrudes from a side of the first spherical portion 10122 and is connected to the first gear 102. The first driving circuit board 1011 is located at an end of the first cylindrical portion 10121 that is away from the first spherical portion 10122.

Referring to FIG. 4, the second driving source 111 includes a second servo 1112 and a second driving circuit board 1111 for driving the second servo 1112. The second servo 1112 includes a second cylindrical portion 11121 and a second spherical portion 11122. The second cylindrical portion 11121 is vertical. The second spherical portion 11122 is connected to one end of the second cylindrical portion 11121. The output shaft of the second servo 1112 protrudes from a side of the second spherical portion 11122 and is connected to the third gear 112. The second driving circuit board 1111 is located at an end of the second cylindrical portion 11121 that is away from the second spherical portion 11122.

As shown in FIGS. 1 and 4, a second housing 160 and a third housing 161 are arranged at opposite sides of the second cylindrical portion 11121. The second housing 160 and the third housing 161 define corporately a space that receives the second cylindrical portion 11121 therein. The second cylindrical portion 11121 defines a number of second connecting grooves 1113. The second cylindrical portion 11121 is fixed to the second housing 160 and the third housing 161 by screws passing through the second connecting grooves 1113

As shown in FIGS. 1 and 5, the ankle further includes a protection casing 18 that is arranged in the foot 23. The first driving source 101 is fixed within the protection casing 18. The foot 23 includes a fourth housing 231, a middle plate 232 and a bottom support 233. The fourth housing 231 and the bottom support 233 form a foot-shaped structure. The middle plate 232 is connected to the bottom support 233. The protection casing 18 defines a connection hole 182. The first cylindrical portion 10121 defines a number of first connecting grooves 1013. The protection casing 18 and the first servo 1012 are connected to the bottom support 233 via a crew passing through the connection hole 182 and a corresponding first connecting groove 1013.

Figure 8:
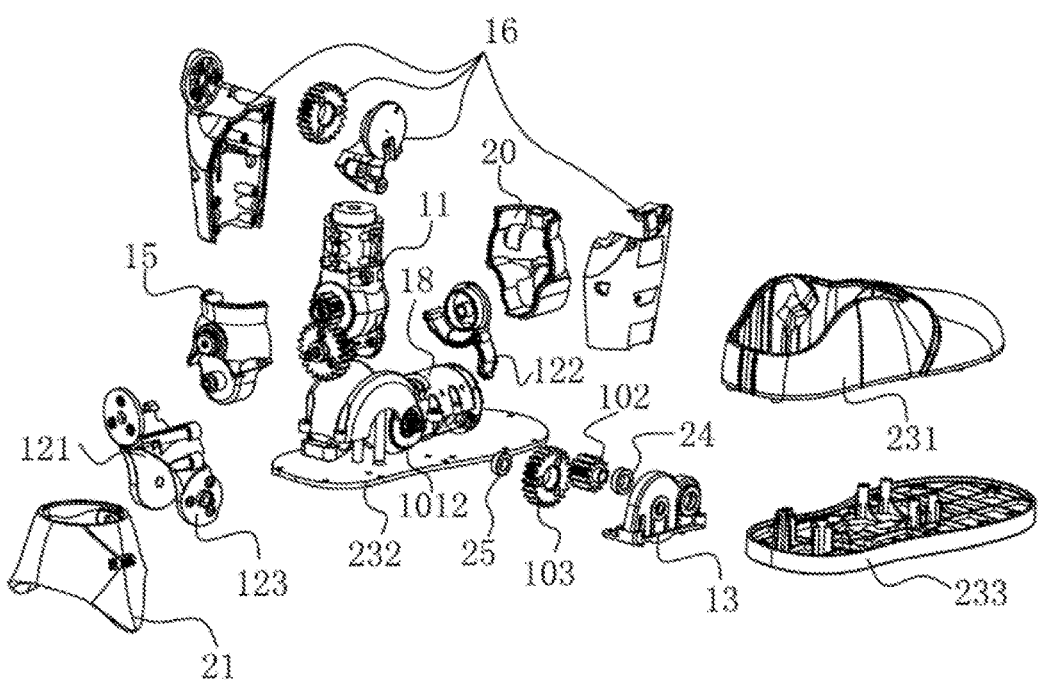
FIG. 8 is an isometric partially exploded view of the ankle assembly of FIG. 1, viewed from another view point.

As shown in FIGS. 2 and 8, in one embodiment, the foot 23 includes a first support 13 and a second support 14. The first support and 13 the second support 14 are arranged at opposite sides of the protection casing 18, and connected to the foot 23. Specifically, the first support 13 and the second support 14 are connected to the middle plate 232. The first gear 102 and the second gear 103 are rotatably connected to the first support 13.

The first connection plate 123 and the second connection plate 124 of the connection support 12 are connected to opposite sides of the protection casing 18. The bottom of the receiving space 127 is spaced apart a distance from the top of the protection casing 18. The output shaft of the first servo 1012 protrudes from a side of the protection casing 18 that faces the first support 13. The first gear 102 is arranged around the output shaft of the first servo 1012 and engaged with the second gear 103. The first gear 102 is rotatably connected to the first support 13 via a second bearing 24. The second gear 103 is rotatably connected to the first support 13 via a third bearing 25. The first connection plate 123 is fixed to a side of the second gear 103 that is away from the first support 13. When the second gear 103 rotates, the first connection plate 123 and the second connection plate 124 are driven to rotate together with the second gear 103 about the rotation axis of the second gear 103. The second connection plate 124 is connected to an outer side of the protection casing 18 via the second support 14, and is rotatably connected to the second support 14. The second connection plate 124 is held in position by the second support 14. The protection casing 18 defines a recess 181 extending along the rotational path of the connection support 12 to prevent interference of the connection support 12 with the protection casing 18 during rotation of the connection support 12.

As shown in FIGS. 2 and 4, the ankle assembly further includes a connection member 22 and a first housing 15 for providing rotational support. The connection member 22 is fixed to the second driving source 111. The first housing 15 surrounds a portion of a lateral surface of the second driving source 111. The fourth connection plate 126 is rotatably connected to the connection member 22. The third gear 112 and the fourth gear 113 are rotatably connected to the first housing 15. Specifically, the ankle assembly further includes a fifth housing 20. The first housing 15 and the fifth housing 20 surrounds the second spherical portion 11122. The fourth connection plate 126 is rotatably connected to the connection member 22. The first housing 15 defines two mounting holes that are arranged corresponding to the rotation axes of the third gear 112 and the fourth gear 113. Screws are used to pass through the mounting holes and screwed into the bearings where the third gear 112 and the fourth gear 113 are located. The first housing provides support for the bearings where the third gear 112 and the fourth gear 113 are located. The connection member provides support for the fourth connection plate 126.

Referring also to FIG. 1, the ankle assembly further includes a sixth housing 21. The sixth housing 21 surrounds the connection support 12 so as to protect the connection support 12.

Referring also to FIGS. 2 and 3, the ankle assembly further includes a first angular sensing assembly 19. The first angular sensing assembly 19 includes a first magnet 192 and a first plastic circuit board (PCB) 191. The first PCB 191 includes a first magnetic encoder. The second connection plate 124 defines a first annular groove 1241 in a side facing the second support 14 for receiving a first bearing 17 therein. The first annular groove 1241 includes a first circular hole 1242 in a center thereof. The first magnet 192 is disposed within the first circular hole 1242 and is opposite to the first magnetic encoder on the first PCB 191. The first PCB 191 is disposed on one side of the protection casing 18 that faces the second support 14. When the first driving assembly 10 rotates with respect to the connection support 12, the first PCB 191 rotates, together with the first driving assembly 10, the protection casing 18 and the second support 14, about the rotation axis of the second support 14. The first magnet 192 is fixed in the connection support 12. The first magnetic encoder on the first PCB 191 records the rotation angle of the first driving assembly 10 with respect to the connection support 12 by means of the change of an induced magnetic field, so as to determine the rotation angle of the foot 23, i.e., the angle of dorsiflexion and plantarflexion of the foot 23.

In the embodiment, the ankle assembly further includes a second angular sensing assembly (not shown). The second angular sensing assembly includes a second magnet and a second plastic circuit board (PCB). The second PCB includes a second magnetic encoder. The second PCB is connected to the connection member 22. The fourth connection plate 126 defines a second annular groove 1261 in a side facing the connection member 22 for receiving a bearing therein. The second annular groove 1261 includes a second circular hole 1262 in a center thereof. The second magnet is disposed within the second circular hole 1262 and is opposite to the second magnetic encoder on the second PCB. When the connection support 12 rotates with respect to the second driving assembly 11, the second magnet rotates, together with the connection support 12, about the rotation axis of the fourth connection plate 126. The second PCB is fixed to the connection member of the second driving assembly 11. The second magnetic encoder on the second PCB records the rotation angle of the connection support 12 with respect to the second driving assembly 11 by means of the change of an induced magnetic field, so as to determine the rotation angle of the foot 23, i.e., the angle of inversion and eversion of the foot 23.

In one embodiment, a robot includes the foot 23, the leg 16 and the ankle assembly as described above.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. An ankle assembly of a robot, the ankle assembly being arranged between a foot of the robot and at least a portion of a leg of the robot, the ankle comprising a first driving assembly, the first driving assembly comprising:
  a first driving source comprising a first output shaft;
  a second driving source; and
  a gear set comprising a first gear and second gear that are engaged with each other, the first gear being arranged around the first output shaft:
  wherein the ankle assembly further comprising a second driving assembly and a connection support; the first driving assembly is connected to the foot, the second driving assembly is connected to the at least a portion of the leg, and the connection support is connected to the first driving assembly and the second driving assembly.

2. The ankle assembly of claim 1, wherein a number of teeth of the first gear is smaller than a number of teeth of the second gear, the second gear is connected to the connection support; when the first gear rotates together with the output shaft of the first driving source, the second gear rotates as driven by the first gear, which enables the first driving source and the foot rotate, as a whole, about a central axis of the second gear; the second driving assembly is configured to drive the connection support to rotate with respect to the leg.

3. The ankle assembly of claim 2, wherein the second driving assembly comprises the second driving source, a third gear and a fourth gear, the second driving source is fixed to the at least a portion of the leg, an output shaft of the second driving source is configured to drive the third gear to rotate, the third gear is engaged with the fourth gear, a number of teeth of the third gear is smaller than a number of teeth of the fourth gear, the fourth gear is connected to the connection support, which allows the connection support to rotate with respect to a central axis of the fourth gear.

4. The ankle assembly of claim 3, wherein the connection support comprises a first connection plate, a second connection plate, a third connection plate and a fourth connection plate, the first connection plate and the second connection plate are coaxial with each other, the third connection plate and the fourth connection plate are coaxial with each other, a central axis of the first connection plate and a central axis of the third connection plate are perpendicular to each other and do not intersect each other, the second gear is fixed to and coaxial with the first connection plate, and the fourth gear is fixed to and coaxial with the third connection plate.

5. The ankle assembly of claim 4, wherein the connection support further comprises a first support and a second support, the first connection plate, the second connection plate and the third connection plate are connected to the first support, and the fourth connection plate is connected to the second support.

6. The ankle assembly of claim 3, wherein the first driving source comprises a first servo and a first driving circuit board for driving the first servo, the first servo comprises a first cylindrical portion and a first spherical portion, the first cylindrical portion is horizontal with respect to the foot, the first spherical portion is connected to one end of the first cylindrical portion, the output shaft of the first servo protrudes from a side of the first spherical portion and is connected to the first gear, the first driving circuit board is located at an end of the first cylindrical portion that is away from the first spherical portion.

7. The ankle assembly of claim 3, wherein the second driving source comprises a second servo and a second driving circuit board for driving the second servo, the second servo comprises a second cylindrical portion and a second spherical portion, the second cylindrical portion is vertical, the second spherical portion is connected to one end of the second cylindrical portion, the output shaft of the second servo protrudes from a side of the second spherical portion and is connected to the third gear, the second driving circuit board is located at an end of the second cylindrical portion tat is away from the second spherical portion.

8. The ankle assembly of claim 4, further comprising a protection casing arranged therein, wherein the first driving source is fixed within the protection casing.

9. The ankle assembly of claim 8, further comprising a first support and a second support, wherein the first support and the second support are arranged at opposite sides of the protection casing, and connected to the foot, and the first gear and the second gear are rotatably connected to the first support.

10. The ankle assembly of claim 4, further comprising a connection member and a first housing, wherein the connection member is fixed to the second driving source, the first housing surrounds a portion of a lateral surface of the second driving source, the fourth connection plate is rotatably connected to the connection member, the third gear and the fourth gear are rotatably connected to the first housing.

11. The ankle assembly of claim 8, further comprising a first angular sensing assembly, wherein the first angular sensing assembly comprises a first magnet and a first plastic circuit board (PCB), the first PCB comprises a first encoder, the first magnet is arranged at the second connection plate, the first PCB is connected to the protection casing, and the first encoder opposes the first magnet.

12. The ankle assembly of claim 10, further comprising a second angular sensing assembly, wherein the second angular sensing assembly comprises a second magnet and a second plastic circuit board (PCB), the second PCB comprises a second encoder, the second magnet is arranged at the fourth connection plate, the second PCB is connected to the connection member, and the second encoder opposes the second magnet.

* * * * *